US 11,707,849 B2

(12) United States Patent
Kaga et al.

(10) Patent No.: US 11,707,849 B2
(45) Date of Patent: Jul. 25, 2023

(54) PROGRAM IDENTIFICATION METHOD AND ROBOT SYSTEM

(71) Applicant: SEIKO EPSON CORPORATION, Tokyo (JP)

(72) Inventors: Kosuke Kaga, Matsumoto (JP); Jiro Tsuruno, Okaya (JP); Naoki Tsukahara, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 335 days.

(21) Appl. No.: 17/008,670

(22) Filed: Sep. 1, 2020

(65) Prior Publication Data

US 2021/0060791 A1    Mar. 4, 2021

(30) Foreign Application Priority Data

Sep. 3, 2019   (JP) ................................. 2019-160194

(51) Int. Cl.
| | | |
|---|---|---|
| *G06F 8/61* | (2018.01) | |
| *B25J 13/06* | (2006.01) | |
| *G05B 13/02* | (2006.01) | |
| *B25J 9/16* | (2006.01) | |

(52) U.S. Cl.
CPC ............... *B25J 13/06* (2013.01); *B25J 9/163* (2013.01); *G05B 13/0265* (2013.01); *G06F 8/61* (2013.01)

(58) Field of Classification Search
None
See application file for complete search history.

(56) References Cited

U.S. PATENT DOCUMENTS

| | | | |
|---|---|---|---|
| 5,051,676 A * | 9/1991 | Seki ....................... | B25J 9/1671 |
| | | | 901/17 |
| 7,600,119 B2 * | 10/2009 | Takano .................... | H04L 67/12 |
| | | | 713/168 |
| 10,193,740 B1 * | 1/2019 | Patel ...................... | H04W 4/021 |
| 10,806,534 B2 * | 10/2020 | Hashimoto ............. | B25J 9/1633 |
| 11,016,753 B2 * | 5/2021 | Sato ........................ | G06F 8/65 |
| 2003/0193406 A1 * | 10/2003 | Kinugawa ............... | B60R 25/33 |
| | | | 340/870.16 |
| 2010/0325623 A1 * | 12/2010 | Ikeda ..................... | G05B 19/414 |
| | | | 901/6 |
| 2015/0154015 A1 | 6/2015 | Ukai et al. | |
| 2018/0229363 A1 | 8/2018 | Kurihara et al. | |

FOREIGN PATENT DOCUMENTS

| | | |
|---|---|---|
| JP | 2016060018 A | 4/2016 |
| JP | 2018130803 A | 8/2018 |
| WO | 2013175704 A1 | 11/2013 |

OTHER PUBLICATIONS

Search Report of the First Office Action CN Application No. 2020109042518 dated Apr. 15, 2023.

* cited by examiner

*Primary Examiner* — Marina Lee
(74) *Attorney, Agent, or Firm* — Gang Yu

(57) ABSTRACT

A program identification method is for identifying an application program that is stored in a terminal device coupled to a robot system and that is used for teaching work on an operation of a robot provided in the robot system. The method includes: acquiring program information corresponding to the application program from the terminal device; and comparing the program information with first information stored in the robot system and thus identifying whether the application program is a first application program corresponding to the first information or not.

7 Claims, 8 Drawing Sheets

PROGRAM IDENTIFICATION METHOD AND ROBOT SYSTEM

The present application is based on, and claims priority from JP Application Serial Number 2019-160194, filed Sep. 3, 2019, the disclosure of which is hereby incorporated by reference herein in its entirety.

BACKGROUND

1. Technical Field

The present disclosure relates to a program identification method and a robot system.

2. Related Art

According to the related art, a system in which a general-purpose terminal device storing a dedicated application program is used for teaching on an operation of a robot has been known, as disclosed in JP-A-2018-130803.

However, in the system disclosed in JP-A-2018-130803, whether the application program for teaching stored in the terminal device is a recommended program or not cannot be identified. When an application program that is not recommended is used for teaching work, the teaching work may not be able to be carried out sufficiently.

SUMMARY

A program identification method is for identifying an application program stored in a terminal device coupled to a robot system and used for teaching work on an operation of a robot provided in the robot system. The method includes: acquiring program information corresponding to the application program from the terminal device; and comparing the program information with first information stored in the robot system and thus identifying whether the application program is a first application program corresponding to the first information or not.

In the program identification method, the first information may include a name, ID information, or version information of the first application program.

The program identification method may further include performing communication via a network and updating the first information.

The program identification method may further include causing a teaching operator to choose whether to download the first application program or not, when the application program is identified as not the first application program.

The program identification method may further include causing a teaching operator to choose whether to carry out the teaching work based on the application program or not, when the application program is identified as not the first application program.

The program identification method may further include displaying a result of identifying whether the application program is the first application program or not, at a display unit provided in the terminal device.

In the program identification method, a result of identifying whether the application program is the first application program or not may be notified via a sound outputted from the terminal device.

A robot system includes: a robot; and a control device coupled to a terminal device storing an application program used for teaching work on an operation of the robot and program information corresponding to the application program. The control device includes a memory configured to store computer-executable instructions and first information corresponding to a first application program and a processor configured to execute the computer-executable instructions so as to: acquire the program information from the terminal device; compare the program information and the first information; and identify whether the application program is the first application program or not by the comparison.

DESCRIPTION OF EXEMPLARY EMBODIMENTS

1. Embodiment 1

Figure 1:
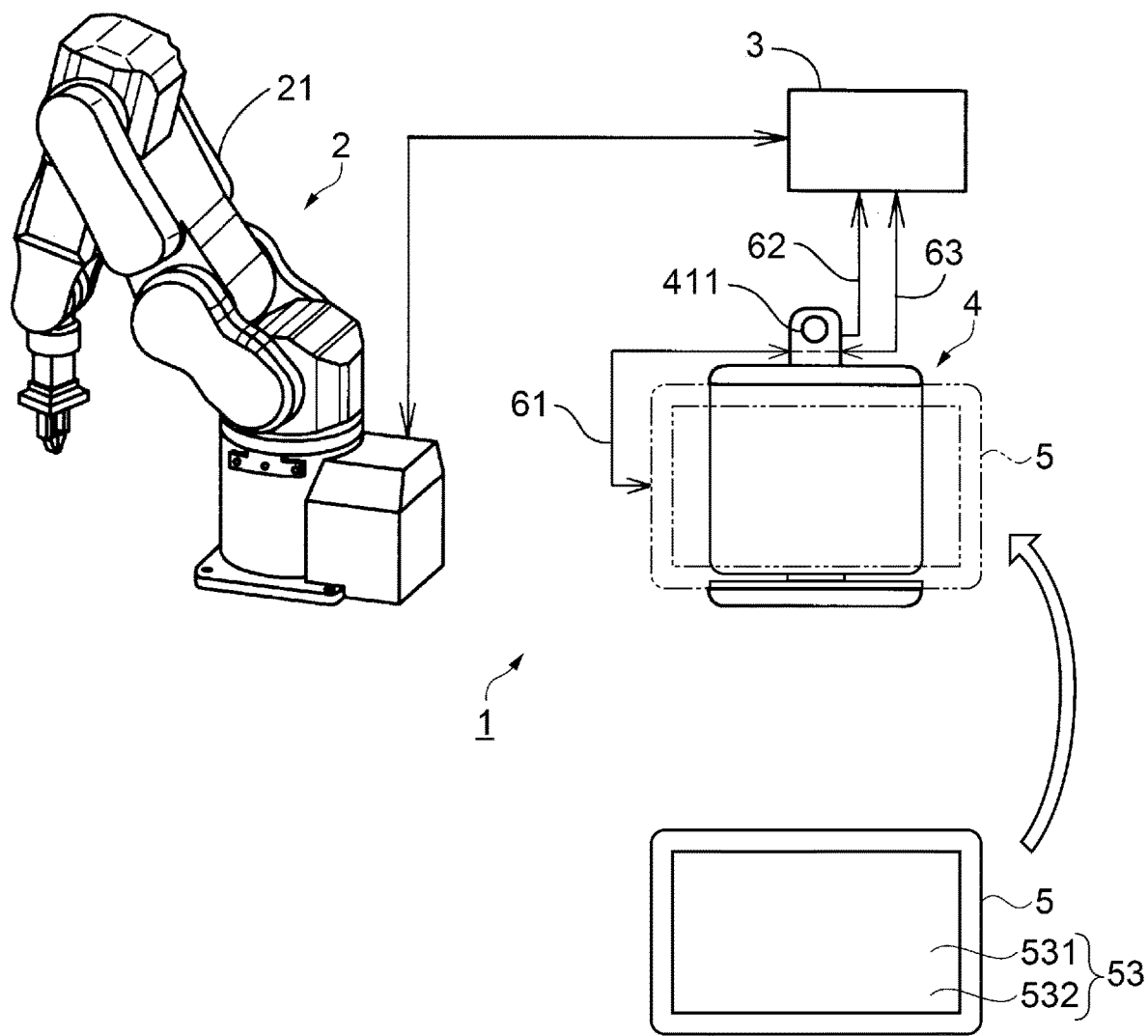
FIG. 1 is a schematic configuration view showing an example of the configuration of a robot system and a terminal device according to Embodiment 1.
Figure 2:
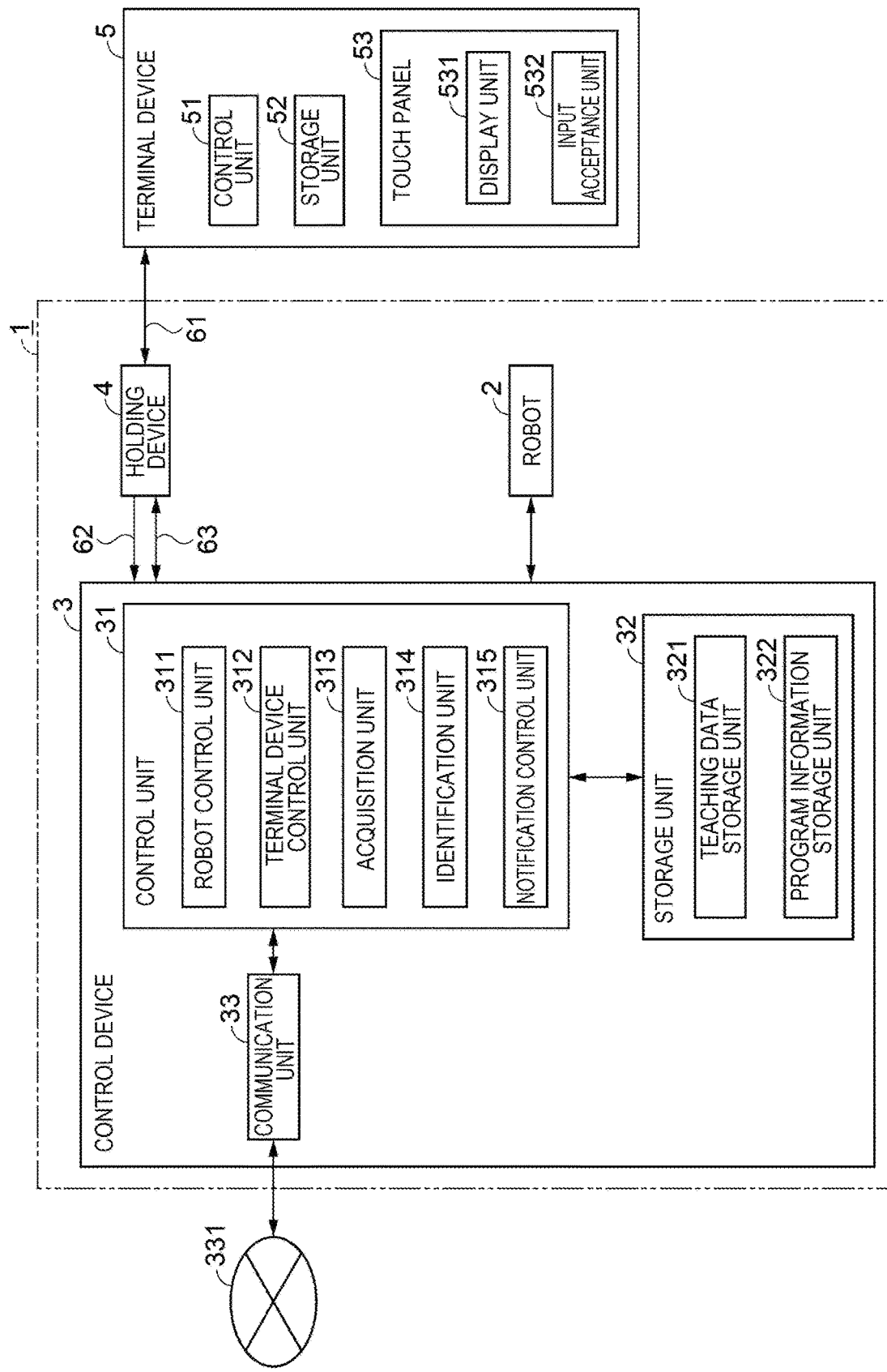
FIG. 2 is a block diagram showing an example of the functional configuration of the robot system and the terminal device.

FIG. 1 a schematic configuration view showing an example of the configuration of a robot system 1 and a terminal device 5 according to Embodiment 1. FIG. 2 is a block diagram showing an example of the functional configuration of the robot system 1 and the terminal device 5. First, a schematic configuration of the robot system 1 according to Embodiment 1 will be described.

The robot system 1 has a robot 2, a control device 3, and a holding device 4. The terminal device 5 is coupled to the robot system 1 when teaching an operation of the robot 2 to the control device 3. The terminal device 5 is held in the holding device 4 and electrically coupled to the holding device 4.

The terminal device 5 is a terminal apparatus such as a tablet PC or smartphone. In embodiment 1, the terminal device 5 is a tablet PC. The terminal device 5 has a control unit 51 controlling operations of the terminal device 5, a storage unit 52, and a touch panel 53. In the storage unit 52, a basic program for controlling basic operations of the terminal device 5 and various application programs operating on the basic program are stored. The application programs stored in the storage unit 52 include an application program for teaching an operation of the robot 2 to the control device 3. The touch panel 53 has a display unit 531 displaying information to a teaching operator, and an input acceptance unit 532 accepting an input operation made by a touch on the display unit 531. In the illustrations, the "application program" may be simply referred to as the "program". In this case, a "first application program" is referred to as a "first program".

The robot 2 is, for example, a vertical articulated robot having an arm 21 having six rotary joints. The arm 21 is provided with a drive unit, not illustrated, for driving the arm 21. The robot 2 is a human symbiotic robot that can coexist and cooperate with a human. Therefore, the robot 2 can work even in an environment where the entry of a human into a range where an interference with the robot 2 may occur is not prohibited. The robot 2 is not limited to a human symbiotic six-axis robot. The robot 2 may have an arm having seven or more rotary joints or may have an arm having five or fewer rotary joints. The number of arms of the robot 2 is not limited to one. A dual-arm robot having two arms may be employed. The robot 2 may be not a human symbiotic robot. The robot 2 is not limited to a vertical articulated robot and may be other types of robots such as a horizontal articulated robot, an orthogonal coordinate robot, and a cylindrical robot. The orthogonal coordinate robot is, for example, a gantry robot.

The control device 3 has a control unit 31, a storage unit 32, and a communication unit 33. The control device 3 is arranged as a separate unit from the robot 2 and outside the robot 2, as shown in FIG. 1. However, the control device 3 may be arranged as a unit unified with the robot 2 and inside the robot 2.

The control unit 31 includes a processor such as a CPU (central processing unit), not illustrated. The processor operates according to a control program stored in the storage unit 32 and thus implements various functional units such as a robot control unit 311, a terminal device control unit 312, an acquisition unit 313, an identification unit 314, and a notification control unit 315.

The storage unit 32 is formed of, for example, an HDD (hard disk drive), an SSD (solid-state drive), an EEPROM (electrically erasable programmable read-only memory), a ROM (read-only memory), a RAM (random-access memory), or the like. The control program and various data are stored in the storage unit 32. The storage unit 32 in this embodiment includes a teaching data storage unit 321 and a program information storage unit 322. Also, the storage unit 32 may be an external storage device coupled to a USB or similar digital input/output port or the like, instead of being built in the robot system 1. In this case, the external storage device is provided from a supplier or the like providing the robot system 1.

In the teaching data storage unit 321, teaching data taught by the teaching operator is stored. The teaching data is data prescribing an operation of the robot 2. Information about an operation designated by the teaching operator using the input acceptance unit 532 of the terminal device 5 is transmitted as teaching data to the control device 3 and stored into the teaching data storage unit 321.

In the program information storage unit 322, program information about a first application program, which is a suitable application program for the robot system 1, is stored from among various application programs for teaching usable in the terminal device 5. The program information is information representing the application program, specifically, the name, ID information, or version information or the like of the application program. Hereinafter, the program information of the first application program is also referred to as "first information". The first application program is, for example, an application program recommended by the supplier or the like providing the robot system 1.

The robot control unit 311 controls an operation of the robot 2 according to the teaching data stored in the teaching data storage unit 321.

The terminal device control unit 312 outputs a signal to the control unit 51 of the terminal device 5 and thus controls an operation of the terminal device 5. For example, the terminal device control unit 312 can cause the terminal device 5 to download an application program or to execute and terminate the application program.

The acquisition unit 313 acquires, from the terminal device 5, the program information about the application program for teaching stored in the storage unit 52.

The identification unit 314 compares the program information acquired by the acquisition unit 313 with the first information stored in the program information storage unit 322 and thus identifies whether the application program for teaching stored in the terminal device 5 is the first application program corresponding to the first information or not.

The notification control unit 315 outputs a signal to the control unit 51 of the terminal device 5 and causes the terminal device 5 to notify the teaching operator of a notification content. The notification control unit 315 in this embodiment outputs a signal about a display screen to the control unit 51 and thus causes a display on the display unit 531. Hereinafter, this process is simply described as "the notification control unit 315 causes a display on the display unit 531".

The communication unit 33 is coupled to a network 331 such as the Internet and communicates with a server or the like, not illustrated, via the network 331. The communication unit 33 can be implemented by hardware such as a communication ASIC or communication processor, or by communication firmware. For example, the communication unit 33 performs communication processing in conformity with the Ethernet (trademark registered) specifications, as processing on a physical layer or data link layer. The communication unit 33 also performs communication processing in conformity with the TCP/IP specifications, as processing on a network layer or transport layer.

When the robot system 1 is coupled to the network 331 via the communication unit 33, the control unit 31 causes the communication unit 33 to communicate with the server and acquires the latest information about the first information from the server. Based on this information, the control unit 31 determines whether the first information stored in the program information storage unit 322 is the latest information or not. When this first information is not the latest information, the control unit 31 updates the first information stored in the program information storage unit 322 to the latest information.

Figure 3:
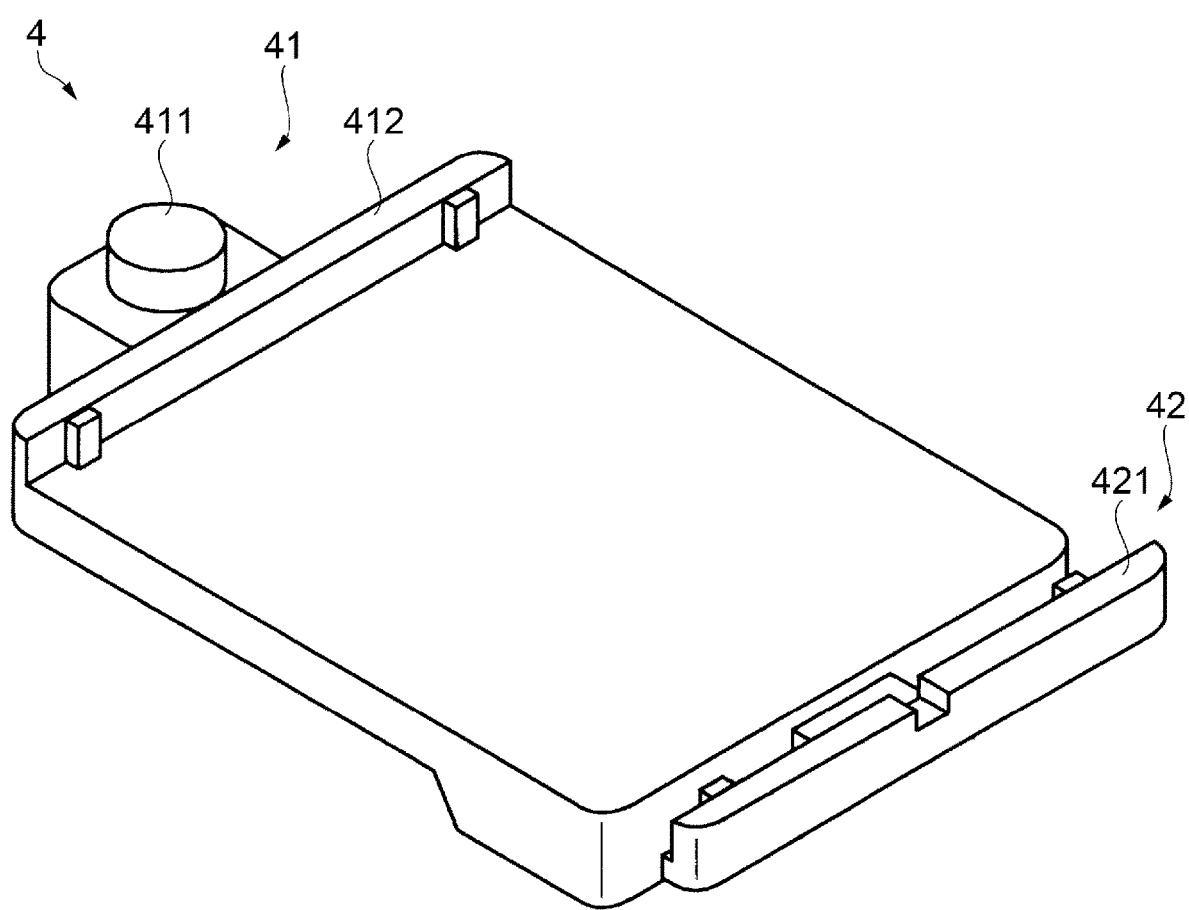
FIG. 3 is a schematic configuration view showing an example of a holding device.

FIG. 3 is a schematic configuration view showing an example of the holding device 4. The holding device 4 has a first member 41 and a second member 42. The first member 41 is provided with a stop switch 411 to stop the robot 2 from operating. The terminal device 5 is held by the holding device 4 in such a way as to be held between a first holding part 412 provided in the first member 41 and a second holding part 421 provided in the second member 42. The second member 42 moves relatively to the first member 41 so as to change the distance between the first holding part 412 and the second holding part 421. Therefore, the holding device 4 can hold the terminal device 5 of various sizes and shapes. When the teaching operator performs direct teaching such as applying an external force directly to the robot 2, the holding device 4 may have an enable switch to enable the robot 2 to operate only when the teaching operator presses with a force within a predetermined range.

As shown in FIGS. 1 and 2, the holding device 4 and the terminal device 5 are coupled together via a coupling wiring 61 such as a USB cable or LAN cable. The holding device 4 is also coupled to the control device 3 via a first wiring 62 and a second wiring 63.

The first wiring 62 is used as a transmission path for transmitting a stop signal to stop the robot 2 from the holding device 4 to the control device 3 when the operator operates the stop switch 411. Since the holding device 4 and the control device 3 are wired together via the first wiring 62, the certainty at the time of stopping the robot 2 via the stop switch 411 is higher than a case where these devices are wirelessly coupled together. The second wiring 63 is coupled to the coupling wiring 61 via the holding device 4 and is used for mutual communication between the terminal device 5 and the control device 3. The signal transmission path via the first wiring 62 and the signal transmission path via the second wiring 63 are different lines from each other. Therefore, an instruction to stop the robot 2 can be executed using the stop switch 411 of the holding device 4, regardless of whether the terminal device 5 and the holding device 4 are coupled together or not.

When the stop signal is transmitted from the holding device 4 to the control device 3, the notification control unit 315 of the control device 3 may transmit, to the terminal device 5, information representing that the stop signal is transmitted, and may cause the display unit 531 to display that information. This enables the teaching operator to check that the stop signal is properly transmitted from the holding device 4 to the control device 3.

A process executed by the robot system 1 will now be described with reference to the flowchart shown in FIG. 4.

Figure 4:
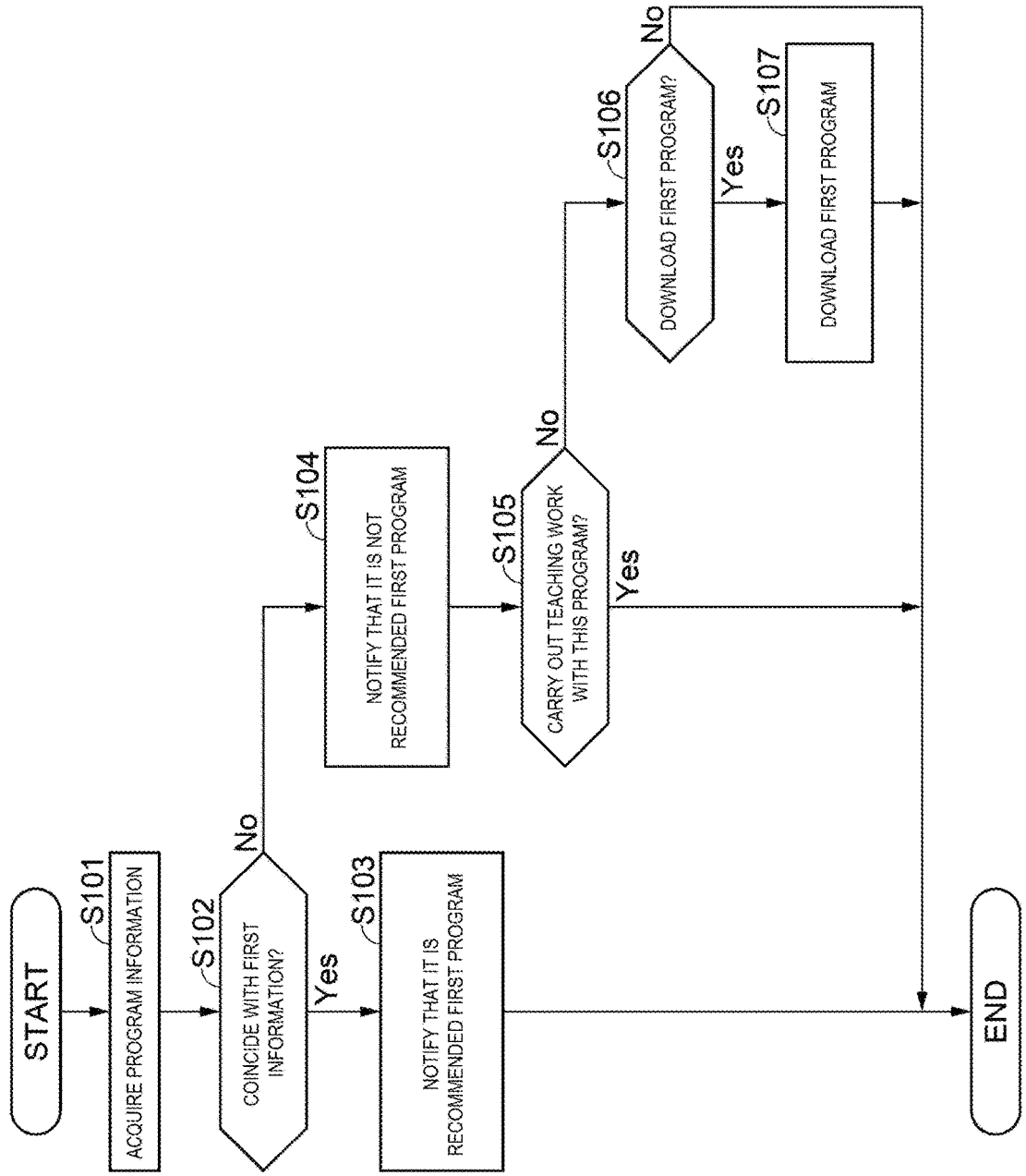
FIG. 4 is a flowchart showing a program identification method according to Embodiment 1.
Figure 5:
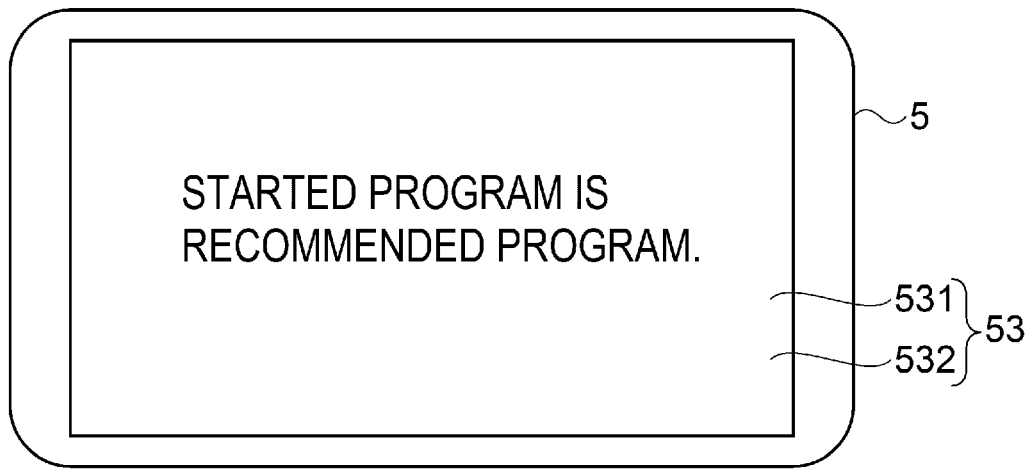
FIG. 5 shows an example of a display screen displayed by a display unit according to Embodiment 1.
Figure 6:
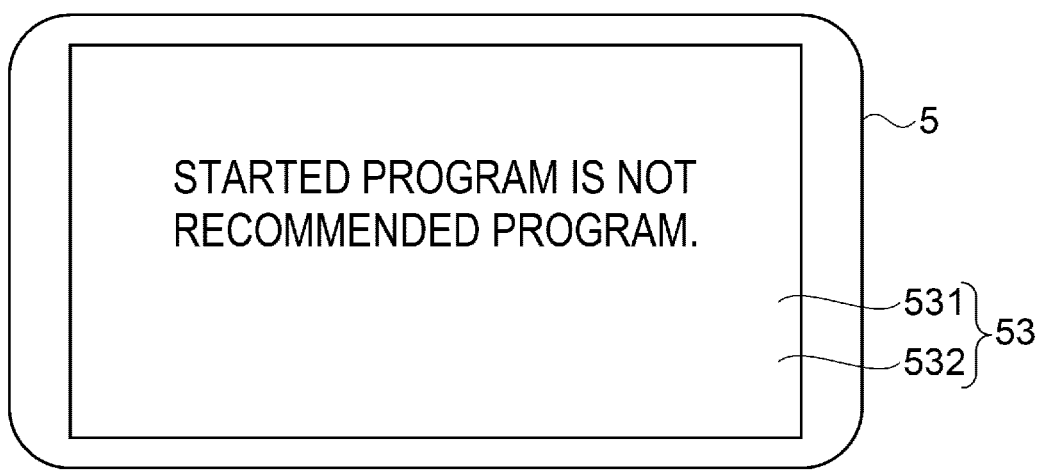
FIG. 6 shows an example of a display screen displayed by the display unit according to Embodiment 1.
Figure 7:
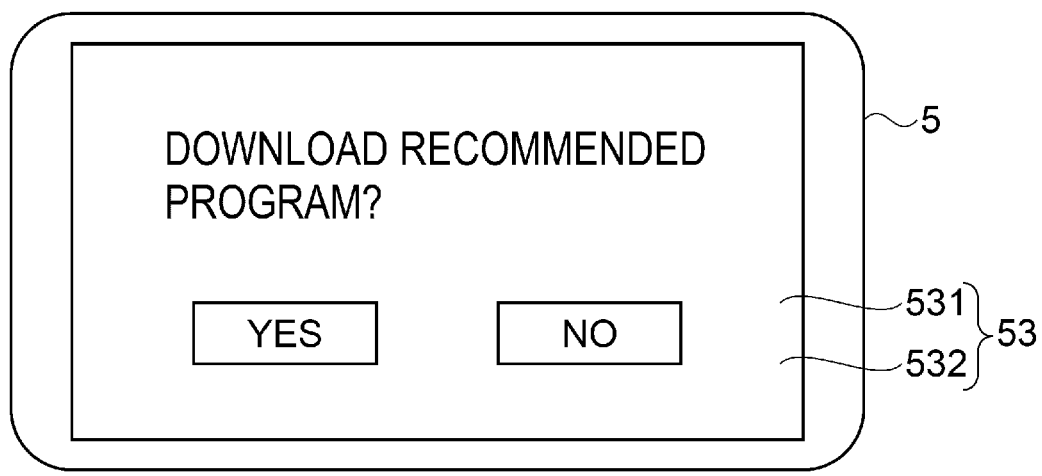
FIG. 7 shows an example of a display screen displayed by the display unit according to Embodiment 1.

FIG. 4 is a flowchart showing a program identification method in Embodiment 1 and showing operations of the control device 3. FIGS. 5 to 7 show a display screen displayed by the display unit 531 of the terminal device 5. Not all the steps shown in FIG. 4 are essential. Any step may be skipped and the subsequent step may be executed.

The control unit 31 starts operating according to the flow shown in FIG. 4, on detecting that the teaching operator has executed an application program for teaching stored in the terminal device 5, that is, that the application program for teaching has been started.

First, the acquisition unit 313 acquires the program information of the started application program from the terminal device 5 (step S101).

After step S101, the identification unit 314 compares the program information with the first information stored in the program information storage unit 322 and identifies whether these pieces of information coincide with each other or not (step S102).

When the program information and the first information coincide with each other (Yes in step S102), the notification control unit 315 notifies that the started application program, that is, the application program stored in the terminal device 5, is the first application program recommended by the supplier or the like (step S103). Specifically, the notification control unit 315 causes the display unit 531 to display that the application program started by the teaching operator is the first application program recommended by the supplier or the like, as shown in FIG. 5. The control unit 31 subsequently ends the flow.

When the program information and the first information do not coincide with each other (No in step S102), the notification control unit 315 notifies that the started application program, that is, the application program stored in the terminal device 5, is not the first application program (step S104). Specifically, the notification control unit 315 causes the display unit 531 to display that the application program started by the teaching operator is not recommended by the supplier or the like, as shown in FIG. 6.

After step S104, the notification control unit 315 causes the display unit 531 to display a display screen for allowing the teaching operator to choose whether to carry out teaching work with the application program that is different from the first application program, or not (step S105). The notification control unit 315 then causes the input acceptance unit 532 to accept an input by the teaching operator.

When the teaching operator has chosen to carry out teaching work with the application program that is different from the first application program (Yes in step S105), the control unit 31 ends the flow.

When the teaching operator has chosen not to carry out teaching work with the application program that is different from the first application program (No in step S105), the notification control unit 315 causes the display unit 531 to display a display screen for allowing the teaching operator to choose whether to download the first application program into the terminal device 5 or not, as shown in FIG. 7 (step S106). The notification control unit 315 then causes the input acceptance unit 532 to accept a choosing operation by the teaching operator.

When the teaching operator has chosen to download the first application program (Yes in step S106), the terminal device control unit 312 outputs a signal to the control unit 51 of the terminal device 5 and thus causes the terminal device 5 to terminate the currently working application program and download the first application program (step S107). On completion of downloading, the terminal device control unit 312 causes the terminal device 5 to start the downloaded first application program. The control unit 31 subsequently ends the flow.

When the teaching operator has chosen not to download the first application program (No in step S106), the control unit 31 ends the flow in the state where the non-recommended application program is started.

In this embodiment, the identification unit 314 can identify whether the application program stored in the terminal device 5 is the first application program recommended by the supplier or the like, or not. Thus, the possibility of not being able to sufficiently carry out teaching work by using a non-recommended application program for the teaching work can be reduced.

In this embodiment, the first information is the name, ID information or version information of the first application program. Therefore, an application program can be easily identified with reference to the name, ID information or version information of the application program.

In this embodiment, when the application program stored in the terminal device 5 is identified as not the first application program, the teaching operator is allowed to choose whether to download the first application program or not. Therefore, the time taken by the teaching operator to search for the first application program via the network 331 can be reduced.

In this embodiment, when an application program is identified as not the first application program, the teaching operator is allowed to choose whether to carry out teaching work with the application program or not. Therefore, the teaching operator can carry out the teaching work after recognizing that the application program used is not the recommended first application program.

In this embodiment, the terminal device 5 displays, at the display unit 531, the result of identifying whether the application program stored in the terminal device 5 is the first application program or not. Therefore, the teaching operator can visually recognize the result of the identification.

2. Embodiment 2

This embodiment is different from the robot system 1 according to Embodiment 1 in that the recommended application program for teaching includes two application programs, that is, a first application program and a second application program. In the description below, components similar to those in Embodiment 1 are denoted by the same reference numbers and are not described further in detail.

First information and second information area stored in the program information storage unit 322 in Embodiment 2. The first information is the program information of the first application program. The second information is the program information of the second application program. The first application program and the second application program are different from each other. However, both application programs are for teaching an operation of the robot 2 to the control device 3 and are recommended by the supplier or the like. The difference between the first application program and the second application program in this embodiment is, for example, the degree of difficulty of an operation when teaching with the application program. That is, one application program is for advanced user and the other application program is for beginner. In this case, the teaching operator can choose an application program according to his or her level by the following process.

Figure 8:
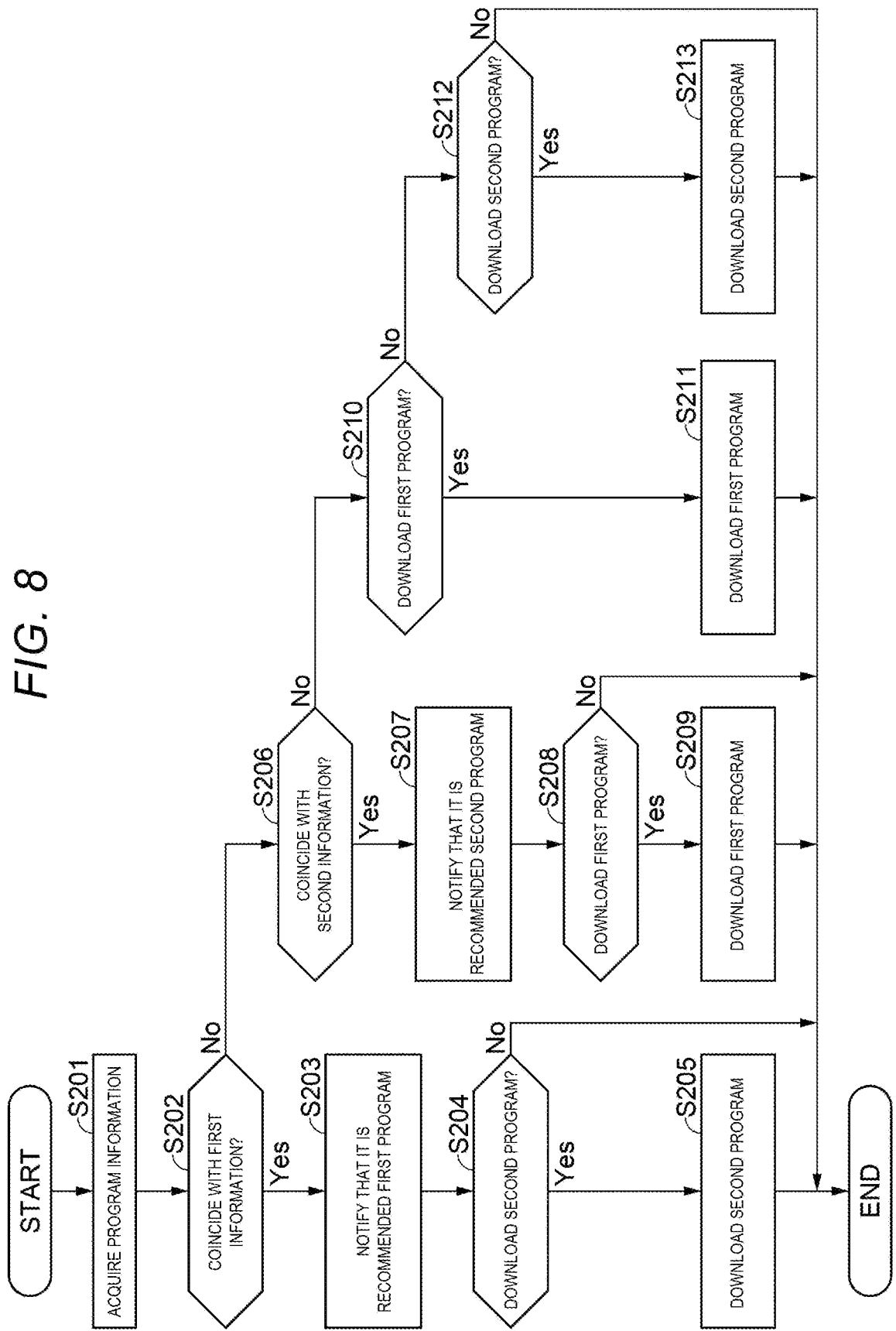
FIG. 8 is a flowchart showing a program identification method according to Embodiment 2.

FIG. 8 is a flowchart showing a program identification method in Embodiment 2 and showing operations of the control device 3. The control unit 31 starts operating according to the flow shown in FIG. 8, on detecting that the teaching operator has started an application program for teaching stored in the terminal device 5, as in Embodiment 1.

In step S201, as in step S101, the acquisition unit 313 acquires the program information of the started application program from the terminal device 5. In step S202, as in step S102, the identification unit 314 identifies whether the acquired program information and the first information stored in the program information storage unit 322 coincide with each other or not.

When the program information and the first information coincide with each other (Yes in step S202), the notification control unit 315 notifies that the application program stored in the terminal device 5 is the first application program recommended by the supplier or the like (step S203).

After step S203, the notification control unit 315 causes the display unit 531 to display a display screen, not illustrated, notifying that the second application program having a different degree of difficulty from the first application program is available, and allows the teaching operator to choose whether to download the second application program into the terminal device 5 or not, within this display screen (step S204). The notification control unit 315 then causes the input acceptance unit 532 to accept a choosing operation by the teaching operator.

When the teaching operator has chosen to download the second application program (Yes in step S204), the terminal device control unit 312 outputs a signal to the control unit 51 of the terminal device 5 and thus causes the terminal device 5 to terminate the currently working first application program and download the second application program (step S205). On completion of downloading, the terminal device control unit 312 causes the terminal device 5 to start the downloaded second application program. The control unit 31 subsequently ends the flow.

When the teaching operator has chosen not to download the second application program (No in step S204), the control unit 31 ends the flow in the state where the first application program is started.

When the program information and the first information do not coincide with each other (No in step S202), the identification unit 314 identifies whether the program information and the second information coincide with each other or not (step S206).

When the program information and the second information coincide with each other (Yes in step S206), the notification control unit 315 notifies that the application program stored in the terminal device 5 is the second application program recommended by the supplier or the like (step S207).

After step S207, the notification control unit 315 causes the display unit 531 to display a display screen, not illustrated, notifying that the first application program having a different degree of difficulty from the second application program is available, and allows the teaching operator to choose whether to download the first application program into the terminal device 5 or not, within this display screen (step S208). The notification control unit 315 then causes the input acceptance unit 532 to accept a choosing operation by the teaching operator.

When the teaching operator has chosen to download the first application program (Yes in step S208), the terminal device control unit 312 outputs a signal to the control unit 51 of the terminal device 5 and thus causes the terminal device 5 to terminate the currently working second application program and download the first application program (step S209). On completion of downloading, the terminal device control unit 312 causes the terminal device 5 to start the downloaded first application program. The control unit 31 subsequently ends the flow.

When the teaching operator has chosen not to download the first application program (No in step S208), the control unit 31 ends the flow in the state where the second application program is started.

When the program information and the second information do not coincide with each other (No in step S206), the notification control unit 315 causes the display unit 531 to display a display screen, not illustrated, notifying that the started application program is not an application program recommended by the supplier or the like, and allows the teaching operator to choose whether to download the first application program into the terminal device 5 or not, within this display screen (step S210). The notification control unit 315 then causes the input acceptance unit 532 to accept a choosing operation by the teaching operator.

When the teaching operator has chosen to download the first application program (Yes in step S210), the terminal device control unit 312 outputs a signal to the control unit 51 of the terminal device 5 and thus causes the terminal device 5 to terminate the currently working application program and download the first application program (step S211). On completion of downloading, the terminal device control unit 312 causes the terminal device 5 to start the downloaded first application program. The control unit 31 subsequently ends the flow.

When the teaching operator has chosen not to download the first application program (No in step S210), the notification control unit 315 causes the display unit 531 to display a display screen, not illustrated, allowing the teaching operator to choose whether to download the second application program into the terminal device 5 or not (step S212). The notification control unit 315 then causes the input acceptance unit 532 to accept a choosing operation by the teaching operator.

When the teaching operator has chosen to download the second application program (Yes in step S212), the terminal device control unit 312 outputs a signal to the control unit 51 of the terminal device 5 and thus causes the terminal device 5 to terminate the currently working application program and download the second application program (step S213). On completion of downloading, the terminal device control unit 312 causes the terminal device 5 to start the downloaded second application program. The control unit 31 subsequently ends the flow.

When the teaching operator has chosen not to download the second application program (No in step S212), the control unit 31 ends the flow in the state where the non-recommended application program is started.

In this embodiment, the identification unit 314 can identify whether the application program stored in the terminal device 5 is the first application program or the second application program, or not. The teaching operator can properly select a desired application program from among a plurality of application programs recommended by the supplier or the like.

3. Modification Example 1

In Embodiments 1 and 2, a configuration where the control unit 31 of the control device 3 executes the operations shown in FIGS. 4 and 8 is described. However, this configuration is not limiting. For example, when the robot 2 has a control unit, the robot 2 may execute the foregoing operations. When the holding device 4 has a control unit, the holding device 4 may execute the foregoing operations. Also, the storage unit 32 storing the first information or the like may be provided in other components than the control device 3 or may be arranged in a component that is different from a control unit executing the foregoing operations. Such configurations enable the arrangement of each component to be freely prescribed in the robot system 1.

4. Modification Example 2

In Embodiments 1 and 2, the notification to the teaching operator is carried out via a display on the display unit 531 of the terminal device 5. However, a display unit may be added to the robot system 1 and the notification to the teaching operator may be carried out at this display unit. This configuration enables visual notification to the teaching operator, using the robot system 1.

5. Modification Example 3

In Embodiments 1 and 2, a configuration where the notification to the teaching operator is carried out via the display unit 531 is described. However, the form of notification is not limited to this. If the robot system 1 or the terminal device 5 may have a light-emitting unit and a content of notification may be defined corresponding to each light-emitting pattern, the notification to the teaching operator via light emission is possible. Also, when the robot system 1 or the terminal device 5 has an audio output unit or a vibrator unit, the notification may be carried out via a sound or vibration. Moreover, the notification may be carried out, using a plurality of measures simultaneously.

6. Modification Example 4

In Embodiments 1 and 2, the acquisition unit 313 acquires the program information when the startup of the application program is detected. However, the acquisition unit 313 may acquire the program information when it is detected that the terminal device 5 is coupled to the holding device 4 via the coupling wiring 61. The acquisition unit 313 may also acquire the program information when it is detected that the input acceptance unit 532 of the terminal device 5 has accepted an operation that enables communication between the terminal device 5 and the robot system 1. According to these configurations, the timing when the acquisition unit 313 acquires the program information can be properly prescribed.

7. Modification Example 5

In Embodiment 2, the difference between the first application program and the second application program may be the time when the application program is prepared. According to this configuration, when an application program prepared at an earlier time is stored in the terminal device 5, the teaching operator can be notified of the presence of a new application program and prompted to use this application program.

8. Modification Example 6

Figure 9:
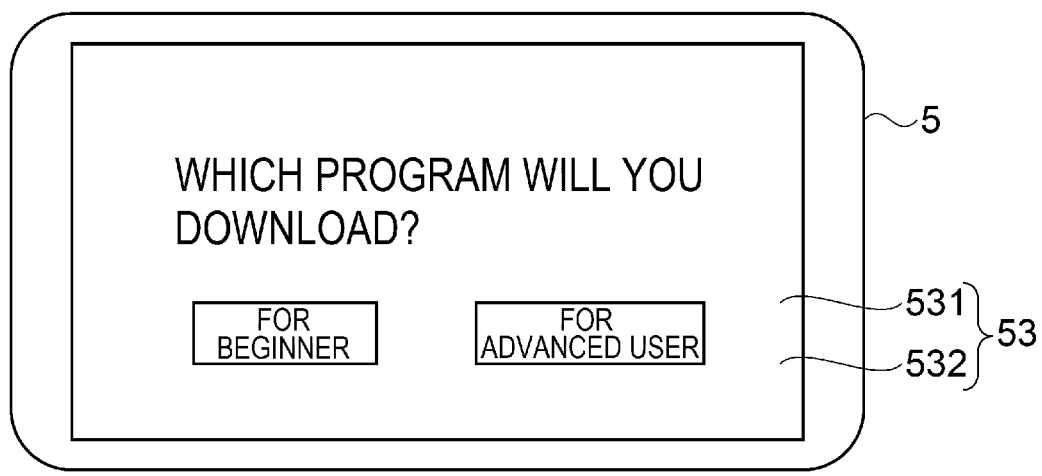
FIG. 9 shows an example of a display screen displayed by a display unit according to a modification example.

In Embodiment 2, when neither one of the first application program and the second application program is stored in the terminal device 5, steps S210 and S212 may be carried out simultaneously. That is, the step of causing the display unit 531 to display a display screen to choose one of the first application program and the second application program and thus allowing the teaching operator to choose one, as shown in FIG. 9, may be employed. This configuration enables reduction in the processing by the teaching operator in step S210 onward.

The contents derived from the embodiments will now be described.

A program identification method is for identifying an application program that is stored in a terminal device coupled to a robot system and that is used for teaching work on an operation of a robot provided in the robot system. The method includes: acquiring program information corresponding to the application program from the terminal device; and comparing the program information with first information stored in the robot system and thus identifying whether the application program is a first application program corresponding to the first information or not.

According to this configuration, whether the application program stored in the terminal device is the first application program or not can be identified. Thus, the possibility of not being able to sufficiently carry out teaching work, for example, by using an application program that is not recommended by the supplier or the like providing the robot, can be reduced.

In the program identification method, the first information may include a name, ID information, or version information of the first application program.

According to this configuration, an application program can be easily identified with reference to the name, ID information or version information of the application program.

The program identification method may further include performing communication via a network and updating the first information.

According to this configuration, even when the first information is changed, the first information stored in the robot system can be updated to the latest information.

The program identification method may further include causing a teaching operator to choose whether to download the first application program or not, when the application program is identified as not the first application program.

According to this configuration, the time taken by the teaching operator to search for the first application program via the network can be reduced.

The program identification method may further include causing a teaching operator to choose whether to carry out the teaching work based on the application program or not, when the application program is identified as not the first application program.

According to this configuration, the teaching operator can carry out the teaching work after recognizing that the application program used is not the first application program.

The program identification method may further include displaying a result of identifying whether the application program is the first application program or not, at a display unit provided in the terminal device.

According to this configuration, the teaching operator can visually recognize the result of the identification of the program.

In the program identification method, a result of identifying whether the application program is the first application program or not may be notified via a sound outputted from the terminal device.

According to this configuration, the teaching operator can auditorily recognize the result of the identification of the program.

A robot system includes: a robot; and a control device coupled to a terminal device storing an application program used for teaching work on an operation of the robot and program information corresponding to the application program. The control device includes a memory configured to store computer-executable instructions and first information corresponding to a first application program and a processor configured to execute the computer-executable instructions so as to: acquire the program information from the terminal device; compare the program information and the first information; and identify whether the application program is the first application program or not by the comparison.

According to this configuration, whether the application program stored in the terminal device is the first application program or not can be identified. Thus, the possibility of not being able to sufficiently carry out teaching work by using a non-recommended application program for the teaching work can be reduced.

What is claimed is:

1. A program identification method for identifying whether an application program for teaching that is stored in a terminal device coupled to a robot system and that is used for teaching work on an operation of a robot provided in the robot system is a recommended program or not, the method comprising:
    acquiring program information corresponding to the application program from the terminal device; and
    comparing the program information with first information stored in the robot system and thus identifying whether the application program is a first application program corresponding to the first information or not,
    wherein the first application program is the recommended program by a supplier,
    when the program information and the first information do not coincide with each other, it is identified that the program information is not the first application program recommended by the supplier, and causing a teaching operator to choose whether to download the first application program or not when the application program is identified as not the first application program.

2. The program identification method according to claim 1, wherein
    the first information includes a name, ID information, or version information of the first application program.

3. The program identification method according to claim 1, further comprising
    performing communication via a network and updating the first information.

4. The program identification method according to claim 1, further comprising
    causing a teaching operator to choose whether to carry out the teaching work based on the application program or not, when the application program is identified as not the first application program.

5. The program identification method according to claim 1, further comprising
    displaying a result of identifying whether the application program is the first application program or not, at a display unit provided in the terminal device.

6. The program identification method according to claim 1, wherein
    a result of identifying whether the application program is the first application program or not is notified via a sound outputted from the terminal device.

7. A robot system comprising:
    a robot; and
    a control device coupled to a terminal device storing an application program used for teaching work on an operation of the robot and program information corresponding to the application program;
    wherein the control device includes a memory configured to store computer-executable instructions and first information corresponding to a first application program and a processor configured to execute the computer-executable instructions so as to perform the program identification method of claim 1.

* * * * *